United States Patent

[11] 3,570,393

| [72] | Inventor | Frank R. Schy |
| | | 1659 Borden Ave., San Mateo, Calif. 94403 |
| [21] | Appl. No. | 857,056 |
| [22] | Filed | Sept. 11, 1969 |
| [45] | Patented | Mar. 16, 1971 |

[54] TACO SHELL FORMING AND COOKING APPARATUS
19 Claims, 8 Drawing Figs.

[52] U.S. Cl. .................................................. 99/404, 99/427
[51] Int. Cl. ....................................................... A47j 37/12, A21c 9/08
[50] Field of Search ........................................ 107/7, 7 (C), 15 (R), 57 (R), 57 (D), 58; 99/353, 404, 373, 426, 427

[56] References Cited
UNITED STATES PATENTS

| 2,603,143 | 7/1952 | Saenz | 99/404X |
| 2,907,268 | 10/1959 | Dodlin | 99/353 |
| 2,967,474 | 1/1961 | Ford | 99/427X |
| 3,267,836 | 8/1966 | Yepis | 99/427X |

*Primary Examiner*—Price C. Faw, Jr.
*Attorneys*—Harvey G. Lowhurst and Lowhurst & Hamrick ABSTRACT: A taco shell forming and cooking apparatus including a beltlike conveyor web formed of a plurality of discrete flexible or articulated segments which are drawn through a cooking bath while being deformed in a predetermined manner. A forming means is disposed above the conveyor web so as to mate therewith as the web is deformed and drawn through the cooking bath. A food product in sheet form placed on the conveyor will be deformed by the mating web, and forming means will be cooked as it is drawn through the cooking bath. Upon emerging from the bath, the forming means is disengaged from the conveyor web, and the shaped and cooked product is removed from the conveyor web before the conveyor web is again returned to its normal configuration.

INVENTOR
FRANK R. SCHY
ATTORNEY

Patented March 16, 1971
3,570,393
3 Sheets-Sheet 3
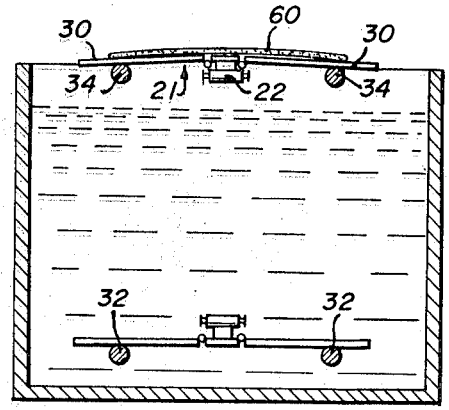
Fig_3
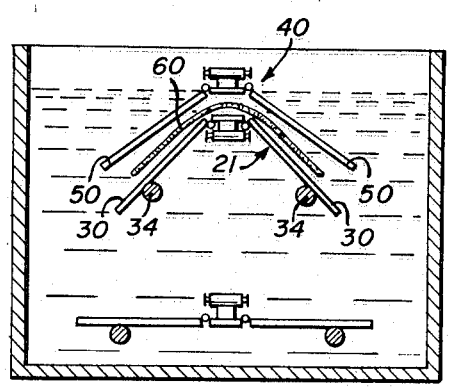
Fig_4
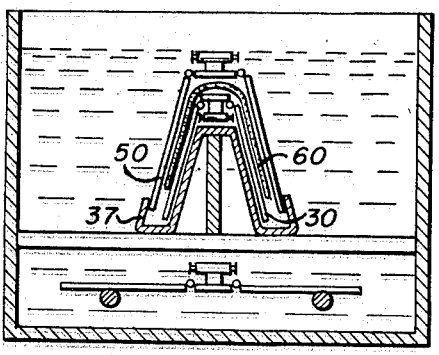
Fig_5
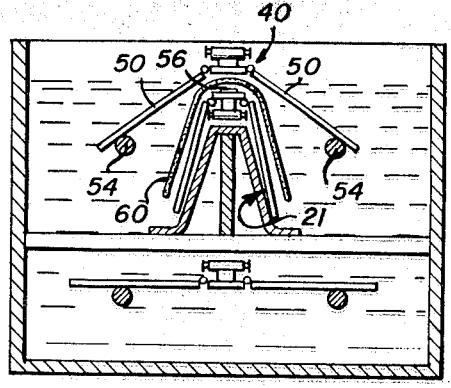
Fig_6
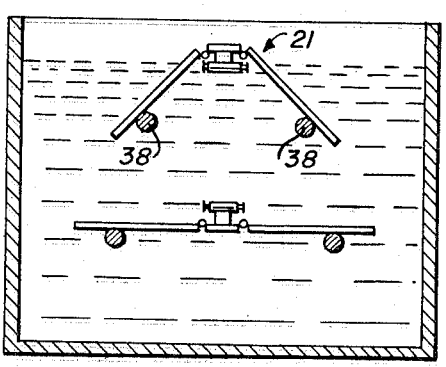
Fig_7
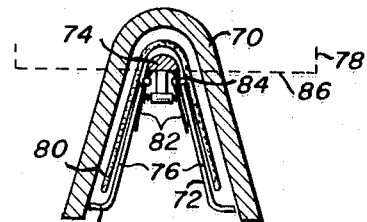
Fig_8
INVENTOR
FRANK R. SCHY
BY Harvey J. Lawhead
ATTORNEY

TACO SHELL FORMING AND COOKING APPARATUS

BACKGROUND OF THE INVENTION

The present invention relates generally to food product cooking devices and, more particularly, to an improved taco shell cooking apparatus which forms the tortilla material and maintains it in a predetermined configuration during the cooking operation.

Taco shell cooking apparatus of various types have been known and used for many years. Among the various devices which have been utilized heretofore are those disclosed in the U.S. Pats. to Saenz 2,603,143, Ford 2,967,474 and Yepis 3,267,836. Each of these devices relates to a means for forming and cooking a tortilla so that it may be utilized in the preparation of tacos or similar food products. However, each of the devices suffers from the disadvantage that it either requires individual loading or it does not adequately protect the shell against damage either during or after the cooking operation. Moreover, all of these devices require the use of fully cooked tortillas. This results in an inferior product to that which can be provided using uncooked or partially cooked tortillas.

In the prior art devices which require individual loading of the tortilla onto a forming mold by either manual or automatic means, one of the principal problems is that that the registry of the tortillas on the forming devices must be carefully controlled so that the resultant product is properly formed. This tends to slow down the operating speed of the apparatus, and increases substantially the mechanical complexity. Other prior art devices, wherein the tortilla is formed by drawing it between resilient forming members, the other lateral forces exerted by the forming members may damage the shell, especially as it becomes brittle near the end of the cooking operation. In addition, these devices are typically complex, difficult to clean, and subject to numerous mechanical difficulties.

OBJECTS OF THE PRESENT INVENTION

It is therefore a primary object of the present invention to provide a novel taco shell cooking and forming apparatus, or the like, which forms the work material as it is introduced into the cooking bath and protects it from injury during the cooking operation.

Another object of the present invention is to provide a novel taco shell cooking apparatus, or the like, which enables a plurality of taco shells to be cooked at a substantially higher rate than has heretofore been permitted.

Still another object of the present invention is to provide a novel taco shell cooking apparatus, or the like, into which the blank tortillas can be randomly fed without requiring any indexing mechanisms.

Still another object of the present invention is to provide a novel taco shell cooking apparatus which can be operated either manually or automatically and which has an output rate which is determined primarily by the feed rate rather than the apparatus drive speed.

SUMMARY OF THE PRESENT INVENTION

The present invention includes a continuous beltlike conveyor web formed of a plurality of discrete flexible or articulated segments which are drawn through a cooking bath while being deformed in a predetermined manner. A similar beltlike forming web is disposed above the conveyor web so as to mate therewith as the two are deformed together and drawn through the cooking bath. A food product in sheet form placed on the conveyor will be deformed by the mating webs and will be cooked as it is drawn through the cooking bath. Upon emerging from the bath, the forming web is separated from the conveyor web, and the shaped and cooked product is removed from the conveyor web before the web is again returned to its normal configuration.

One of the principal advantages of the present invention is that the food product can be randomly positioned along the conveyor web so that the feed rate can be selected to yield the desired output without requiring any indexing or speed adjustments to be made to the machine. Where the device is used to cook taco shells, for example, the tortillas may be loaded thereupon at any desired rate and may be randomly spaced relative to one another. This means that the same machine can be loaded either automatically by simple material handling means, or manually by one having little training or skill.

Another feature of my device is its ability to handle partially cooked tortillas due to the gentleness of the handling action of the machine and the fact that the tortillas are never lifted from the carrying surface prior to being cooked in the oil.

An additional advantage of the present invention is that since there are no individual molds to be loaded, the size of the article being shaped and cooked can be varied without requiring any modifications of the apparatus. Furthermore, different sized articles can even be intermixed without affecting operation of the apparatus.

Still another feature of the apparatus is that it is mechanically simple and can be easily cleaned and serviced.

Still another advantages of the present invention will become apparent to those skilled in the art after having read the following detailed description of a preferred embodiment of the invention which is illustrated in the several figures of the drawing.

IN THE DRAWING

FIGS. 3 through 7 are transverse cross sections taken along the length of the apparatus illustrated in FIGS. 1 and 2.

FIG. 8 illustrates an alternative embodiment of the present invention.

DETAILED DESCRIPTION OF A PREFERRED EMBODIMENT

Figure 1:
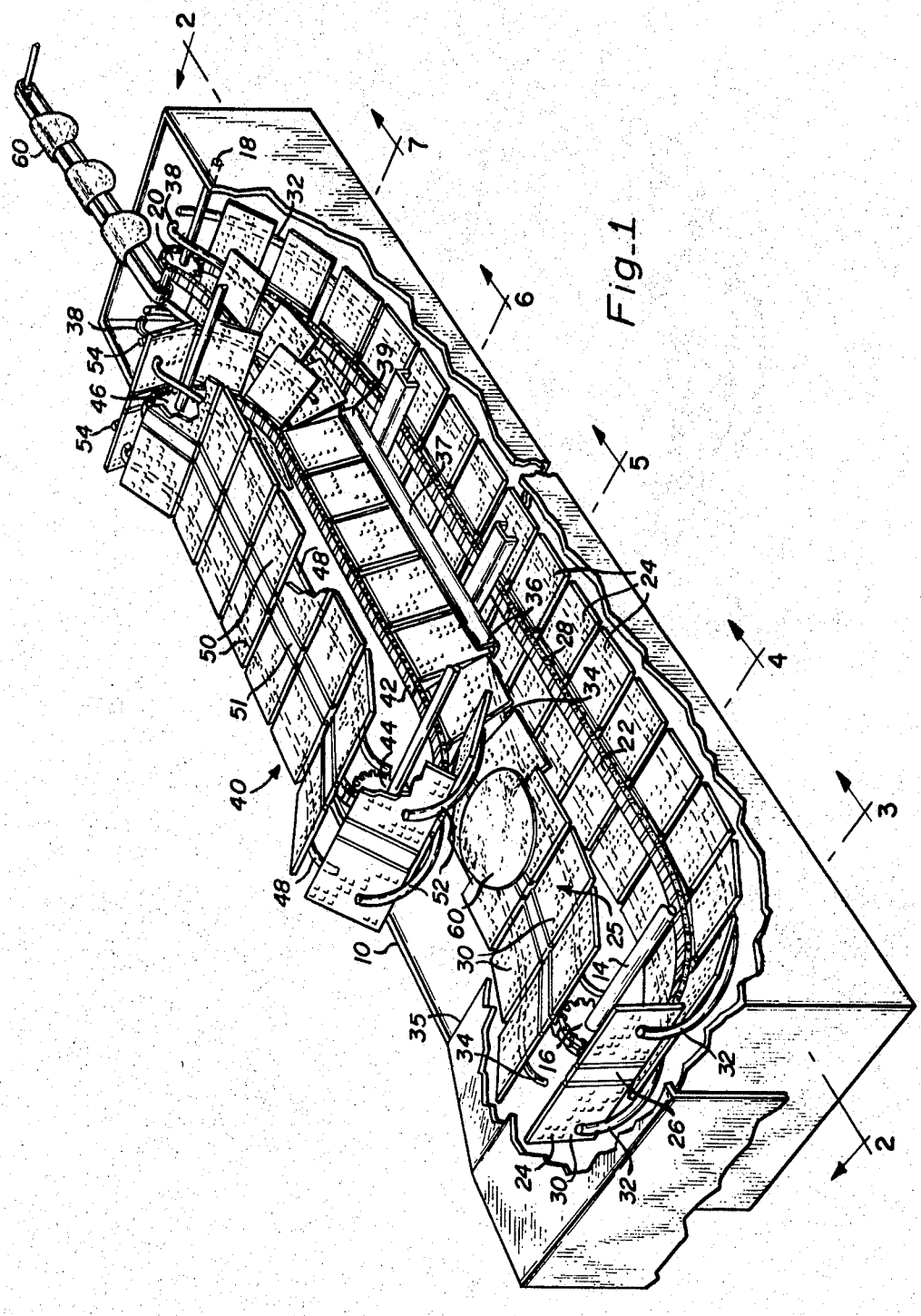
FIG. 1 is a perspective illustration of the operative components of a taco shell cooking apparatus in accordance with the present invention.

Referring now to FIG. 1 of the drawing, a tank or vessel 10 for containing a suitable quantity of cooking oil is shown partially broken away to reveal the operative mechanism of the present invention. Suitable means (not shown) are provided for heating the cooking oil to the desired temperature. Also shown in partially broken form is an inclined feed table 12 which serves the dual purpose of protecting the operator from the conveyor mechanism as it rounds the end sprocket, and providing a work surface upon which the objects to be cooked can be temporarily positioned. Mounted within the tank 10 and at one end thereof is a shaft 14 and sprocket 16. A second shaft 18 and sprocket 20 are similarly mounted at the other end of the tank 10.

Operatively suspended from the sprockets 16 and 20 is a drive chain 22 to which are attached a plurality of articulated conveyor segments 24 which cooperate to form the beltlike conveyor web 25. The segments 24 are comprised of a generally rectangular center section 26 which is affixed to and carried by the chain 22 by suitable fastening means 28, and a pair of winglike extend extensions or flaps 30 which are hingedly attached to the sides of the center section 26. The flaps 30 are preferably formed from a perforated semirigid material such as stainless steel or the like, which can withstand high temperatures and corrosive environments.

Mounted within the tank 10 on either side of the sprocket 16 and extending along the length of the tank are a pair of elongated guide members 32, the ends of which are curved to conform generally to the sag of the chain 22 as it is suspended from the sprockets 16 and 20. The guide members 32 are engaged by the flaps 30 as they pass over the shaft 18 and are drawn through the lower portion of the tank, and serve to support the weight of the flaps 30 as well as guide them through the cooking oil in their fully extended horizontal position so as to reduce the drag on the chain as the segments are drawn through the cooking oil. By keeping the conveyor segments 24 extended horizontally, the travel space required for the web 25 and thus the size of the tank 10 are also kept to a minimum.

Also mounted within the tank 10 is a second pair of guide members 34 which are mounted beneath the upper section of the conveyor 24 and extend from points slightly to the left of the shaft 14 and generally along the contour taken by the chain 22 as it passes over the sprocket 16. At a suitable distance beyond the edge 35 of the table 12, the guide members 34 are deformed inwardly toward the chain 22 and downwardly toward the end 36 of the guide channels 37.

As the web segments 24 pass over the shaft 14, they engage the guide members 34 which hold them in their horizontally extended positions until the guide members 34 start their transition inwardly and downwardly. As the guide members 34 transition, the flaps 30 are caused to progressively rotate downwardly to a lower position wherein the outside edges thereof engage the end 36 of the guide channel 37. The channel 37 maintains the segments 24 in this U-shaped configuration until they reach the end 39. As the flaps 30 leave the opposite end 39 of the guide channel 37, they engage another pair of guide members 38 which cause them to transition back to their horizontal position so that they may be returned over the sprocket 20 and shaft 18.

Disposed above the conveyor web 25 is a similar beltlike forming member 40 comprised of a plurality of articulated segments 41 which are mounted to and carried by the chain 42 which passes over the sprockets 44 and 46. A pair of guide members 48 are mounted alongside the upper path of the chain 42 for supporting the flaps 50 as the segments 41 are drawn between the sprockets 44 and 46. The flaps 50 of the articulated segments 41 comprising the upper web 40 are free to rotate outwardly of the track of chain 42, whereas in the web 25 the flaps 30 are pivotable towards the inside of the track of chain 22.

To the left of the sprocket 44, a pair of guide members 52 are provided for engaging the flaps 50 of web 40 so as to cause the flaps 50 to transition downwardly to mate with the flaps 30 as they progress toward the end 36 of the guide channel 37. Similarly, a pair of guide members 54 are provided at the other end of the apparatus for engaging the flaps 50 as they emerge from the end 39 of channel 38 and causing them to be flared back into a horizontal position so that they may be passed over the sprocket 46 and shaft 47.

Figure 2:
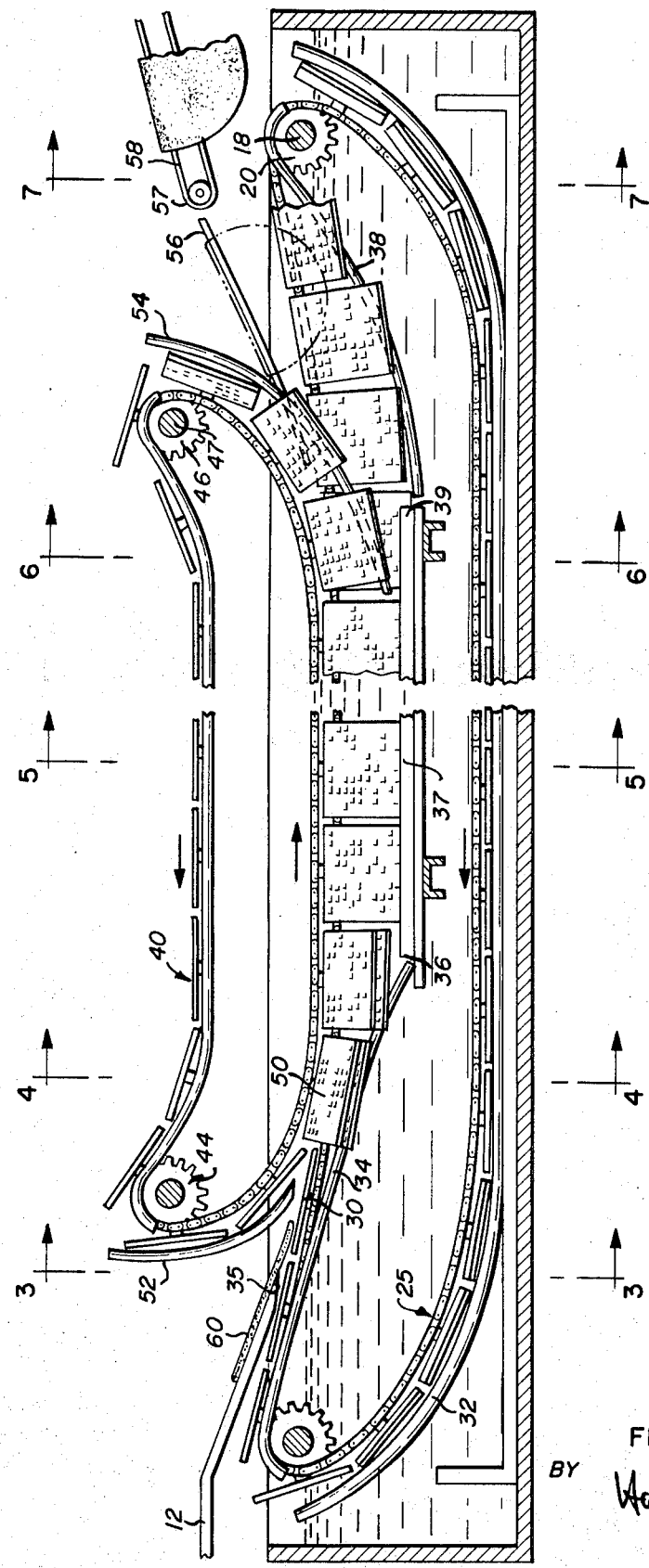
FIG. 2 is a longitudinal cross section of the apparatus illustrated in FIG. 1.

Referring now additionally to FIG. 2 of the drawing, it will be noted that a pick-up rail 56 is extended from the end 57 of the conveyor 58 down to a point just above the upper surface of the web 25 so that as the flaps 50 are flared and raised up out of engagement with the lower web 25, the end 59 is caused to pass beneath the cooked articles, and they are caused to slide up the rail 56 until they reach the conveyor 58 which carries them away from the cooker to an unloading station (not shown) wherein they are removed.

Although the length of the rail 56 is for simplicity shown long as compared to the width of the tortilla, it may be necessary for some types of operation to shorten the length to considerably less than the width of the tortilla to assure that the cooked article is picked up by the conveyor 58 and transported out of the cooking oil. This, of course, is merely a matter of engineering detail.

In operation, the uncooked food product 60, such as, for example, the tortillas used to make taco shells, is fed from the the top of the work table 12 onto the web 25 which carries the tortilla down toward the cooking oil while, at the same time, deforming it as the flaps 30 are allowed to drop downwardly in following the guide means 34 as it transitions in toward the end of the channel 36. As the segments 24 are transitioning into the U-shaped configuration, but before entering the cooking bath, the flaps 50 of the upper web 40 are caused to engage the upper surface of the tortilla 60 as they are drawn past the end of the guide members 52. Thus, the webs 25 and 40 envelope the tortilla so as to positively deform it into the desired configuration as it passes into and through the cooking oil.

Since the food product is placed onto the web 25 in a flat condition and need not be indexed to the web in any specific way other than to be aligned with the middle of the track, it will be readily apparent that it could alternately be loaded onto web 25 by a simple conveyor means so that the entire operation could be automated. Furthermore, the entire process from raw dough, or masa, to finished taco shell could be done in one line. This is not possible with other devices as the tortillas must be fully cooked, stacked and cooled before entering the taco shell forming device.

Referring now to FIGS. 3 through 7, the manner in which the tortillas are deformed, drawn through the cooking oil and then discharged from the cooking apparatus is illustrated in detail. In FIG. 3, the tortilla 60 is shown disposed upon the top surface of the conveyor web 25 as it passes over the edge 35 of feed table 12. Shortly thereafter the guide members 34 cause the flaps 40 to begin to transition downwardly at which time the flaps 50 of the upper web 40 are allowed to drop down over the tortilla and the web 25, as shown in FIG. 4, so as to progressively deform the tortilla 60 as it passes into the cooking oil. The tortilla is fully deformed as the flaps 30 and 50 engage the guide channel 36. The guide channel 36 keeps the flaps 30 and 50 in alignment as they are drawn therethrough, as shown in FIG. 5 of the drawing, so as to hold the tortilla 60 in the desired configuration as it is cooked.

The weight of the upper web should be supported above the lower web so that partially cooked tortillas will not be smashed between the two forming webs. This can be accomplished by providing another guide rail (not shown) on which the chain of the upper web will ride when engaged with the tortilla and the lower web.

As the tortilla carrying webs are drawn beyond the other end 39 of the channel 36, the flaps 50 engage the guide members 54 which cause them to be deflected upward and out of engagement with the tortilla 60 and web 25. A short distance downstream the tortillas are engaged by the end 59 of the rail 56 as shown in FIG. 6, and the tortillas are forced up the rail 56 until they reach the conveyor 58 which carries them along.

After the cooked tortillas have been lifted above the web 25, the flaps 30 engage the guide members 38 which cause them to transition back to their horizontal position so that they may be passed over the sprocket 20 and shaft 18. This transition, however, is made in such a manner that the tortillas are not reengaged since they are brittle and could be easily damaged if the flaring flaps 30 were to apply any force to the sides thereof.

The flaps 30 and 50 of the respective webs 25 and 40 are typically made of light gauge stainless steel perforated plates which are hingedly secured to the center sections 26 and 51 respectively, by suitable hinge means. Although the width of the respective flaps is shown in the drawing as being large as compared to the lateral dimension thereof, it may be found advantageous to utilize flaps having widths which are small as compared to the lateral dimensions so as to provide a smoother transitional surface upon which the article to be cooked may ride. Furthermore, it may be found desirable to provide some type of resilient interconnection between the outer edges of the flaps so as to make for smoother transitions. These modifications are, however, considered to be improvements suitable for certain applications and will not be described herein in detail.

Referring now to FIG. 8 of the drawing, an alternative embodiment of the deforming apparatus is illustrated. In this embodiment a fixed position tunnellike means 70 is substituted for the upper web 40. Thus tunnellike member 70 is generally U-shaped in cross section, and is disposed along the length of the cooking path above the track of the conveyor web. The means 70 is appropriately flared on either end to provide for a transition in the configuration of the conveyor web segments similar to that of the previous embodiment. The segments 72 of the conveyor web are comprised of a center member 74 which may be either flat, as illustrated in the previous embodiment, or may be shaped as illustrated in this FIG., so as to provide a more suitably rounded center portion of the taco shell.

Pivotally attached to each side of the members 74 are the flaps 76. The opposite edges of the flaps 76 are turned outwardly as indicated at 78 so as to provide means for engaging the inner wall of the guide member 70 to provide a proper spacing therebetween for receiving the tortilla or other work material 80. In order to maintain the flaps 76 in operative engagement with the members 70, suitable spring means 82 are mounted about the pivots 84 so as to continuously bias the flaps 78 outwardly. These springs may serve to eliminate the need for the guide members 34 and 38 shown in the previous embodiment.

As the segments 72 exit from the member 70, the flaps 76 are caused to transition into a horizontal position, such as indicated by the dashed lines at 86, so as to enable them to pass over the end sprockets and be returned either through the cooking tank or exteriorly thereof. It will be noted that in this position the upturned edges 78 also provide a centering means for assisting in maintaining the work material in the proper lateral position thereupon.

Although in this embodiment there may be some frictional engagement between the work material 80 and the inner wall of the guide means 70, it will be readily seen that the lower surface of the means 70 will be well lubricated by the cooking fluid so as to prevent any undesirable sticking thereto. However, should any undesirable friction engagement be encountered in certain applications, it will be understood that a suitable form of gripping means, such as small spikes, or the like, may be provided on the conveyor segments 72 for gripping the work material 80, and preventing any slippage with respect to the conveyor surface.

Although only a single line cooking apparatus has been illustrated, many like mechanisms can be combined in side-by-side arrangement to pass through a common or individual cooking vessel so as to increase the number of cooked articles which may be produced in a given time. Similarly, although the particular apparatus disclosed has been more or less directed to an embodiment for forming and cooking taco shells, it is to be understood that the webs can be adapted to be deformed into any suitable configuration, and the invention is not limited to forming U-shaped articles. Furthermore, neither is the apparatus limited to food product cooking applications since the same apparatus can be used to heat form by radiant, as well as immersion heating processes, many other types of sheet materials such as soft metals, synthetics, plastics and the like.

After having read the above detailed disclosure of a preferred embodiment, it is contemplated that many alterations and modifications of the invention will become apparent to those skilled in the art. Accordingly, I intend that the appended claims be interpreted as covering all such modifications which fall within the true spirit and scope of my invention.

I claim:

1. Means for forming and cooking a food product comprising:
   a cooking bath through which said food product may be passed for cooking;
   an endless conveyor means for carrying said food product through said cooking bath;
   an endless web means disposed proximate said conveyor means so that that a portion thereof operatively engages a portion of said conveyor means to sandwich said food product therebetween as it is passed through said cooking bath, said portion of said web thereafter disengaging said portion of said conveyor means;
   means for deforming said conveyor means and said web means along the engaging portions thereof so as to cause said food product to assume a predetermined configuration during the time of passage through said cooking bath;
   means for removing said food product from said conveyor means at a point proximate the point where said web means disengages said conveyor means.

2. Means for forming and cooking a food product as recited in claim 1 wherein said deforming means causes the engaging portions of said conveyor means and said web means to be deformed in a generally U-shaped configuration as viewed transverse to the direction of movement thereof.

3. Means for forming and cooking a food product as recited in claim 2 wherein said conveyor means is comprised of a plurality of segments including a center member operatively attached to a conveyor drive means and a pair of side flaps one of which is pivotally attached to one side of said center member and the other of which is pivotally attached to the other side of said center member so as to enable the conveyor means to be deformed into said U-shaped configuration.

4. Means for forming and cooking a food product as recited in claim 3 wherein said web means is comprised of a plurality of segments which are deformable into a generally U-shaped configuration as viewed transverse to the direction of movement thereof so as to mate with the deformed segments of said conveyor means.

5. Means for forming and cooking a food product as recited in claim 4 wherein said means for removing said food material from said conveyor means includes a second conveyor means for receiving said food product in its cooked configuration and transporting it away from said cooking bath without causing further deformation thereof.

6. Means for deforming and heating a material in sheet form comprising:
   a heating means through which said sheet material may be drawn for causing said material to be heated;
   an endless conveyor means for carrying said sheet material through said heating means;
   conveyor deforming means for causing a portion of said conveyor means to be deformed into a predetermined configuration as viewed in a cross section taken transverse to the direction of movement of said conveyor means so as to allow said sheet material to likewise be deformed into said predetermined configuration as it is drawn through said heating means; and
   means for removing said sheet material from said conveyor means after it has been drawn a predetermined distance through said heating means.

7. Means for forming and heating a material in sheet form as recited in claim 6 wherein said conveyor means is comprised of a plurality of articulated segments which are deformable into said predetermined configuration.

8. Means for forming and heating a material in sheet form as recited in claim 7 and further including a means disposed above said conveyor means and said sheet material for causing said sheet material to be deformed over said conveyor means as it is caused to pass through said heating means.

9. Means for forming and heating a material in sheet form as recited in claim 8 wherein said means disposed above said conveyor means is a continuous web means which is caused to engage said sheet material and said conveyor means and to be deformed thereover along at least a portion of the length of said conveyor means which is deformed.

10. Means for forming and heating a material in sheet form as recited in claim 9 wherein said web means is comprised of a plurality of articulated segments which are arranged to conform to the deformed configuration of said conveyor means.

11. Means for forming and heating a material in sheet form as recited in claim 10 wherein said conveyor deforming means causes said conveyor means to be deformed into a generally U-shaped transverse cross-sectional configuration.

12. Taco shell forming and cooking apparatus comprising:
    a cooking vessel through which the uncooked starting material may be drawn for causing said material to be cooked;
    an endless beltlike conveyor means for carrying said material through said cooking vessel;
    conveyor deforming means for causing the material carrying portion of said conveyor means to be deformed into a predetermined configuration so as to allow said material to likewise be deformed into said predetermined configuration as it is drawn through said cooking vessel; and means for removing the resulting formed and cooked material from said conveyor means after it has been drawn a predetermined distance through said cooking vessel.

13. Taco shell forming and cooking apparatus as recited in claim 12 wherein said predetermined configuration is generally U-shaped as viewed in a cross section taken transverse to the direction of movement of said conveyor means.

14. Taco shell forming and cooking apparatus as recited in claim 13 and further including means operatively engaged by said conveyor means and said material for causing said material to be deformed over said conveyor means as it is drawn through said cooking vessel.

15. Taco shell forming and cooking apparatus as recited in claim 14 wherein said means operatively engaged by said conveyor means and said material is a fixed tunnellike member suitably configured for causing said material to be deformed over said conveyor means as it is engaged thereby.

16. Taco shell forming and cooking apparatus as recited in claim 14 wherein said last named means is a continuous web means which is engaged by said conveyor means and said material and is deformed thereover along at least a portion of the deformed length of said conveyor means.

17. Taco shell forming and cooking apparatus as recited in claim 15 wherein said conveyor means is comprised of a plurality of articulated segments which are deformable into said U-shaped configuration.

18. Taco shell forming and cooking apparatus as recited in claim 17 wherein said web means is comprised of a plurality of articulated segments which are adapted to conform to the deformed configuration of said conveyor means.

19. Taco shell forming and cooking apparatus as recited in claim 12 and further including means for deforming said material over the deformed material carrying portion of said conveyor means.